US007821224B2

(12) United States Patent
Baglino et al.

(10) Patent No.: US 7,821,224 B2
(45) Date of Patent: Oct. 26, 2010

(54) VOLTAGE ESTIMATION FEEDBACK OF OVERMODULATED SIGNAL FOR AN ELECTRICAL VEHICLE

(75) Inventors: Andrew David Baglino, San Francisco, CA (US); Troy Adam Nergaard, San Francisco, CA (US); Heath Hofmann, State College, PA (US)

(73) Assignee: Tesla Motors, Inc., Palo Alto, CA (US)

( * ) Notice: Subject to any disclaimer, the term of this patent is extended or adjusted under 35 U.S.C. 154(b) by 365 days.

(21) Appl. No.: 12/100,801

(22) Filed: Apr. 10, 2008

(65) Prior Publication Data
US 2009/0255740 A1 Oct. 15, 2009

(51) Int. Cl.
*H02P 23/00* (2006.01)
(52) U.S. Cl. .................. 318/808; 318/811; 318/139
(58) Field of Classification Search .......... 318/808, 318/811, 139
See application file for complete search history.

(56) References Cited

U.S. PATENT DOCUMENTS

| 5,329,217 | A | * | 7/1994 | Kerkman et al. ........ 318/811 |
| 5,656,911 | A | * | 8/1997 | Nakayama et al. ........ 318/718 |
| 6,084,377 | A | * | 7/2000 | Seok .................. 318/798 |
| 6,707,270 | B2 | * | 3/2004 | Chen et al. ............ 318/798 |
| 6,844,701 | B2 | * | 1/2005 | Chen et al. ............ 318/825 |
| 6,870,350 | B2 | | 3/2005 | Garrigan et al. |

FOREIGN PATENT DOCUMENTS

| EP | 1236607 A2 | 9/2002 |
| JP | 03169993 | 6/2003 |
| JP | 05304175 | 10/2005 |
| WO | WO-2009126291 A2 | 10/2009 |

OTHER PUBLICATIONS

"International Application Serial No. PCT/US2009/002224, Written Opinion mailed Nov. 24, 2009", 5 pgs.
"International Application Serial No. PCT/US2009/002224, Search Report mailed Nov. 24, 2009", 4 pgs.
Hofmann et al., Stator-Flux-Based Vector Control of Induction Machines in Magnetic Saturation, IEEE Transactions on Industry Applications, vol. 33, No. 4, Jul./Aug. 1997, pp. 935-942.

* cited by examiner

*Primary Examiner*—Walter Benson
*Assistant Examiner*—David S Luo
(74) *Attorney, Agent, or Firm*—Patent Law Office of David G. Beck

(57) ABSTRACT

A voltage estimation system for motor control feedback is described. The system may include one or more control modules which may generate voltage commands. An overmodulation or "clipping" module receiving a voltage command can generate a clipped voltage. Rather than measuring directly, a voltage estimator may estimate the clipped voltage based on the duty cycle command to the inverter. This estimated voltage may then be used by a flux estimator to estimate a flux value. Other embodiments are described and claimed.

10 Claims, 6 Drawing Sheets

VOLTAGE ESTIMATION FEEDBACK OF OVERMODULATED SIGNAL FOR AN ELECTRICAL VEHICLE

BACKGROUND

An extremely large percentage of the world's vehicles run on gasoline using an internal combustion engine. The use of such vehicles, more specifically the use of vehicles which rely on fossil fuels, i.e., gasoline, creates two problems. First, due to the finite size and limited regional availability of such fuels, major price fluctuations and a generally upward pricing trend in the cost of gasoline are common, both of which can have a dramatic impact at the consumer level. Second, fossil fuel combustion is one of the primary sources of carbon dioxide, a greenhouse gas, and thus one of the leading contributors to global warming. Accordingly, considerable effort has been spent on finding alternative drive systems for use in both personal and commercial vehicles. Electric vehicles offer one of the most promising alternatives to vehicles that use internal combustion drive trains.

One of the principal issues involved in designing a comfortable and efficient electric drive for a vehicle lies in the control of the motor. Motor control has generally evolved from industrial, on-grid applications where power efficiency and constantly variable speed and torque commands are less prevalent. In on-grid and off-grid applications, it may be beneficial to be able to get additional torque above the base speed of a motor.

BRIEF DESCRIPTION OF THE DRAWINGS

Embodiments of inventive subject matter may be best understood by referring to the following description and accompanying drawings, which illustrate such embodiments. In the drawings.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1:
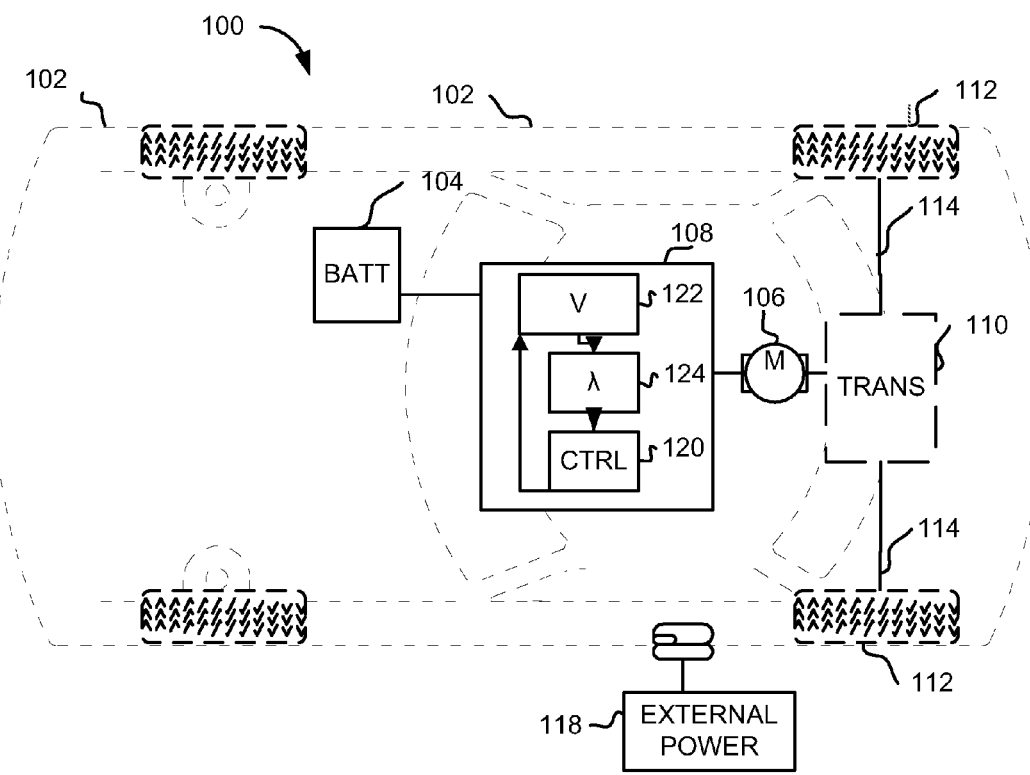
FIG. 1 shows a vehicle system according to one embodiment of the present subject matter.

FIG. 1 shows an electric vehicle system 100 according to one embodiment of the present subject matter. In various embodiments, the vehicle 102 is an electric vehicle and includes a vehicle propulsion battery 104 and at least one propulsion motor 106 for converting battery energy into mechanical motion, such as rotary motion. The present subject matter includes examples in which the vehicle propulsion battery 104 is a subcomponent of an energy storage system ("ESS"). An ESS includes various components associated with transmitting energy to and from the vehicle propulsion battery in various examples, including safety components, cooling components, heating components, rectifiers, etc. The inventors have contemplated several examples of ESS, and the present subject matter should not be construed as limiting the configurations disclosed herein, as other configurations of a vehicle propulsion battery and ancillary components are possible.

The vehicle propulsion battery 104 can include a lithium ion battery in various examples. In some embodiments, the vehicle propulsion battery 104 includes a plurality of lithium ion batteries coupled in parallel and/or in series. Some examples include cylindrical lithium ion batteries. In some examples, the ESS includes one or more batteries compatible with the 18650 battery standard, but the present subject matter is not so limited. The vehicle propulsion battery 104, in some examples, provides approximately 390 volts.

Additionally illustrated is a controller 108. The controller 108 may be part of a larger system which is used to convert energy from the vehicle propulsion battery 104 into voltage signals to drive the at least one propulsion motor 106. The controller 108 may include an energy converter according to some embodiments. Additionally, the controller 108 may be separate from an energy converter. The controller 108 controls the operation of the motor 106. Commands for torque or speed for example may come from a driver or another source and can be translated by the controller 108 to derive output at the motor 106. One or more algorithms which may include estimates and measurements may be used by the controller 108 in order to provide appropriate voltages to the motor 106 for output. Operating estimates and measurements may vary with time, motor speed, vehicle speed, battery voltage, system resistance and other factors. Changes in these and other factors can influence the algorithms and equations used to derive commands for the motor 106 in the controller 108.

According to various embodiments, the controller 108 includes control modules 120 which may operate to provide voltage commands to be used in controlling motor operation. The voltage commands may be generated by the control modules 120 in order to cause the motor 106 to produce a particular torque output. Sometimes the voltage command requested and the actual voltage given to the motor may differ. Rather than directly measuring the actual voltage given to the motor, a voltage estimator 122 may be used to estimate that voltage value. The estimated voltage determined by the voltage estimator 122 may then be used by a flux estimator 124 to estimate the flux through the motor 106. This flux estimate may then be used by the control modules 120 to determine an appropriate voltage command to allow the motor 106 to generate a desired amount of torque.

In some examples, the controller 108 and the control modules 120, voltage estimator 122 and flux estimator 124 include transistors. Some examples include one or more field effect transistors. Some examples include metal oxide semiconductor field effect transistors. Some examples include one or more insulated gate bipolar transistors. As such, in various examples, the controller 108 may include a switch bank or inverter which is configured to receive a direct current ("DC") power signal from the vehicle propulsion battery 104 and to output a three-phase alternating current ("AC") signal to power the vehicle propulsion motor 106.

The propulsion motor 106 is a three phase AC propulsion motor, in various examples. Some examples include a plurality of such motors. Other motor types are also contemplated, including brushless direct current (BLDC) motors. The present subject matter can optionally include a transmission 110 in some examples. While some examples include a 2-speed transmission, other examples are contemplated. Manually clutched transmissions are contemplated, as are those with hydraulic, electric, or electrohydraulic clutch actuation. Some examples employ a dual-clutch system that, during shifting, phases from one clutch coupled to a first gear to another clutch coupled to a second gear. Rotary motion is transmitted from the transmission 110 to wheels 112 via one or more axles 114, in various examples.

A power connector 118 may be provided to transmit energy with the vehicle propulsion battery 104, in various examples. In some examples, the power connector 118 converts power from a 110V AC power source into power storable by the vehicle propulsion battery 104. In additional examples, the power connector 118 converts power from a 220V AC power source into power storable by the vehicle propulsion battery 104. The present subject matter is not limited to examples in which a converter for converting energy from an external source to energy usable by the vehicle 102 is located outside the vehicle 102, and other examples are contemplated.

Figure 2:
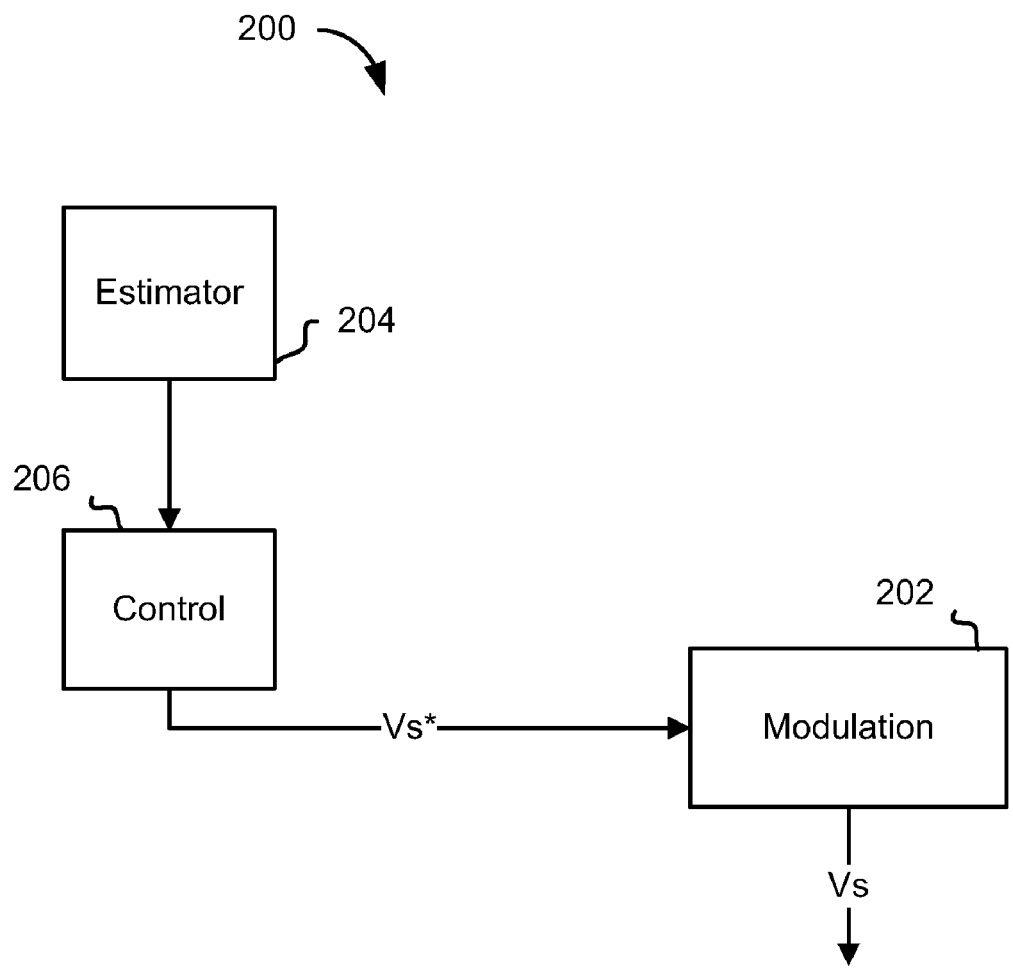
FIG. 2 is a block diagram of a system for motor control feedback according to various embodiments.

FIG. 2 is a block diagram of a system 200 for motor control feedback according to various embodiments. The system 200 includes a modulation unit 202, an estimator 204 and a control unit 206.

The control unit 206 generates a command signal for the purpose of controlling a motor. The command signal may be for example a voltage command (Vs*). The voltage command may be determined based on a number of factors including a requested torque value, motor speed, current through the motor, flux linkage ("flux") within the motor, and others. In order to apply the voltage command, the modulation unit 202 may modulate the voltage command. The modulation unit 202 may take the voltage command as an input, and apply necessary modulation and/or conversion to generate an output voltage (Vs). In some embodiments, the output voltage may be a voltage signal or signals applied to phases of a motor, and in other embodiments, the output voltage may be the actual voltage or voltages across phases of the motor. The output voltage can be a useful value for the control unit 206 to know in order to determine subsequent voltage commands. Rather than measuring the output voltage directly, the estimator 204 may estimate the output voltage based on the value of the voltage command according to an embodiment. According to other embodiments, the estimator 204 may estimate the output voltage based on control signals or other voltages generated by the modulation unit 202.

According to various embodiments, the estimator 204 may use the estimated output voltage to estimate a flux value. The estimator 204 may then send the estimated flux value to the control unit 206 to be used in generating a new voltage command. In some embodiments, the estimator 204 and the modulation unit 202 may be integrated within the control unit 206.

According to some embodiments, the output voltage may not be of similar magnitude as the voltage command. In some instances, the voltage command may be above a threshold and the modulation unit 202 may overmodulate or clip the voltage command to create the output voltage at or below a threshold. The estimator 204 estimates the output voltage based on the overmodulated or clipped voltage command. In some embodiments, the estimator 202 may be aware of the threshold voltage at which clipping may occur and also the amount or type of clipping that is performed by the modulation unit 202. The estimator 204 is able to create a feedback loop to the control unit 206 through an estimation process rather than direct measurement.

Figure 3:
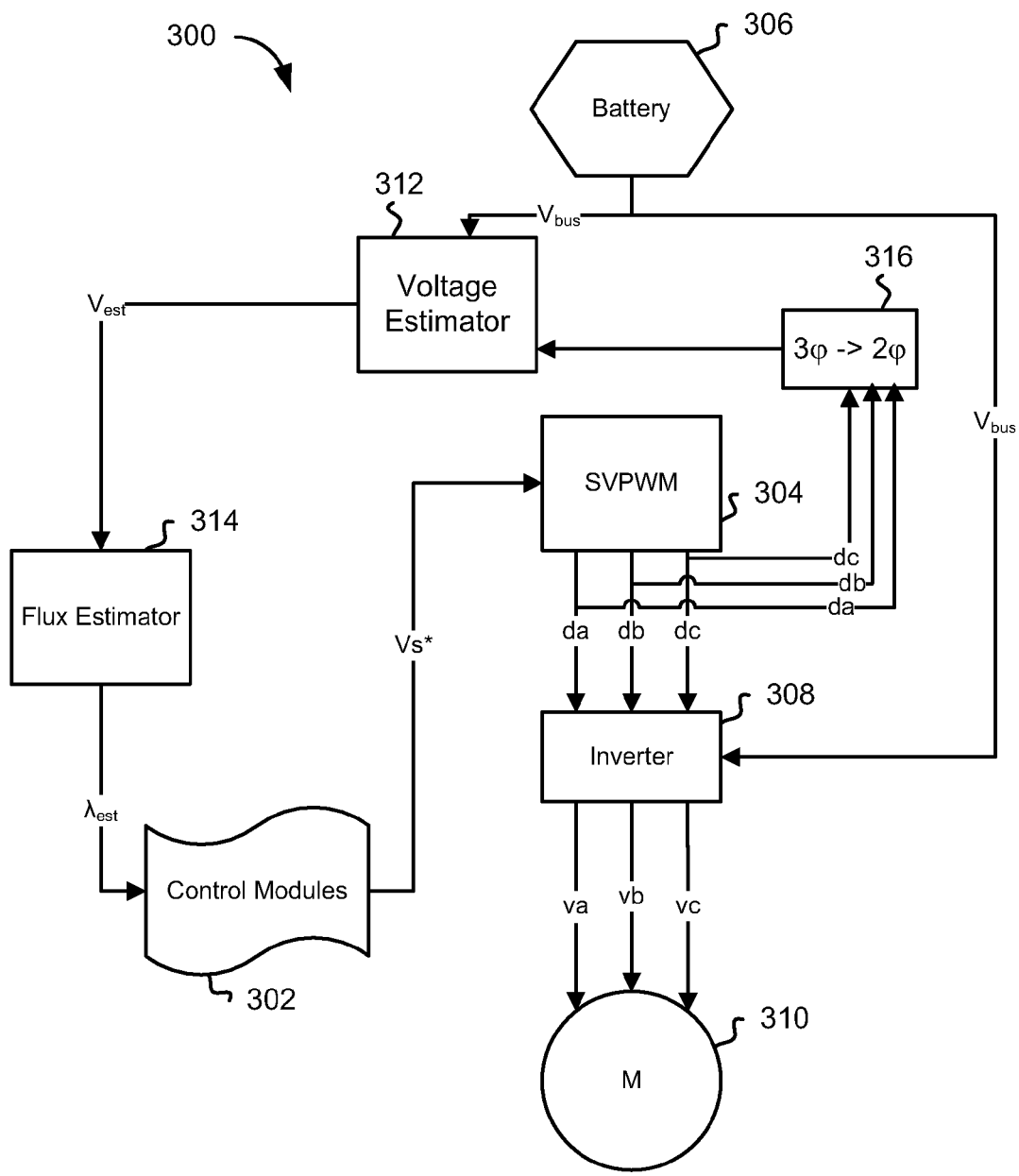
FIG. 3 is a more detailed block diagram of a system for motor control feedback according to various embodiments.

FIG. 3 is a more detailed block diagram of a system 300 for motor control feedback according to various embodiments. The system 300 includes control modules 302, a modulation unit 304, a battery 306, an inverter 308, a motor 310, a voltage estimator 312, a flux estimator 314 and a 3-phase to 2-phase converter 316.

Similar to the control unit 202 described above with reference to FIG. 2, the control modules 302 are operable to generate a voltage command. In general operation, the voltage command is sent to the modulation unit 304. The modulation unit 304 may use space vector modulation (SVM), pulse width modulation (PWM), space vector pulse width modulation (SVPWM), or other modulation techniques according to various embodiments. The modulation unit 304 may use the voltage command to create control signals (da, db, dc) for the inverter 308. The control signals (da, db, dc) may be duty cycle commands limited at 0% and 100%, or values near those extents to implement small pulse elimination. The inverter 308 may be connected to the battery 306 via a battery bus. According to some embodiments, the battery 306 may alternatively be another electrical supply represented by a DC bus. Based on the control signal and battery bus inputs, the inverter 308 may generate voltage signals to control a motor. The inverter, which may be a three phase DC to AC inverter, may use the control signals from the modulation unit 308 and the voltage on the battery bus to generate AC voltage signals (va, vb, vc) to be applied across the phase windings to drive the motor 310. The motor 310, which may be an AC induction motor, may create a torque output based on the AC voltage signals from the inverter 308.

For more accurate, efficient and stable operation of the system 300, a feedback loop may be utilized to determine various attributes of the operation of the motor 310. The phase voltages, as well as the flux through the motor are values which can impact the voltage command generated by the control modules 302. In order to accurately respond to a torque request, a determination of the flux through the motor 310 may be used. The flux value may be estimated if phase voltages are known. Sometimes phase voltages are difficult to measure. The voltage estimator 312 may take the control signals from the modulation unit 304 as an input and determine estimated phase voltages. The control signals may first need to be converted from 3-phase to 2-phase by the 3-phase to 2-phase converter 316. According to various embodiments, the 3-phase to 2-phase converter 316 may be a Clarke transform (also known as a Clark transform). The voltage estimator 312 may estimate phase voltages by multiplying the control signals (duty cycles) by the voltage on the battery bus ($V_{bus}$) from the battery 306. The phase voltage estimation by the voltage estimator may take into account dead-time compensation, IR drop across phase windings, diode or p-n junction voltage drops, and other factors which may affect the actual voltage across phase windings. In some embodiments, an estimated phase voltage may represent a line to neutral voltage.

The estimated phase voltages may be used by the flux estimator 314 to estimate the flux through the motor 310. The flux estimator 314 may then send the estimated flux value to the control modules 302 to be used to generate subsequent voltage commands. In an example embodiment, the flux estimator 314 may estimate a flux value with a stator flux estimate using the phase voltage estimation. As mentioned above, the phase voltage estimation may be based on a dead-time compensated phase voltage command minus a voltage drop for the stator winding in that particular phase. The determined phase voltage $V_s$ may be used to calculate the flux in the stator by $\lambda = \int V_s * dt$. Other examples of voltage based flux estimate calculation are also considered.

Figure 4:
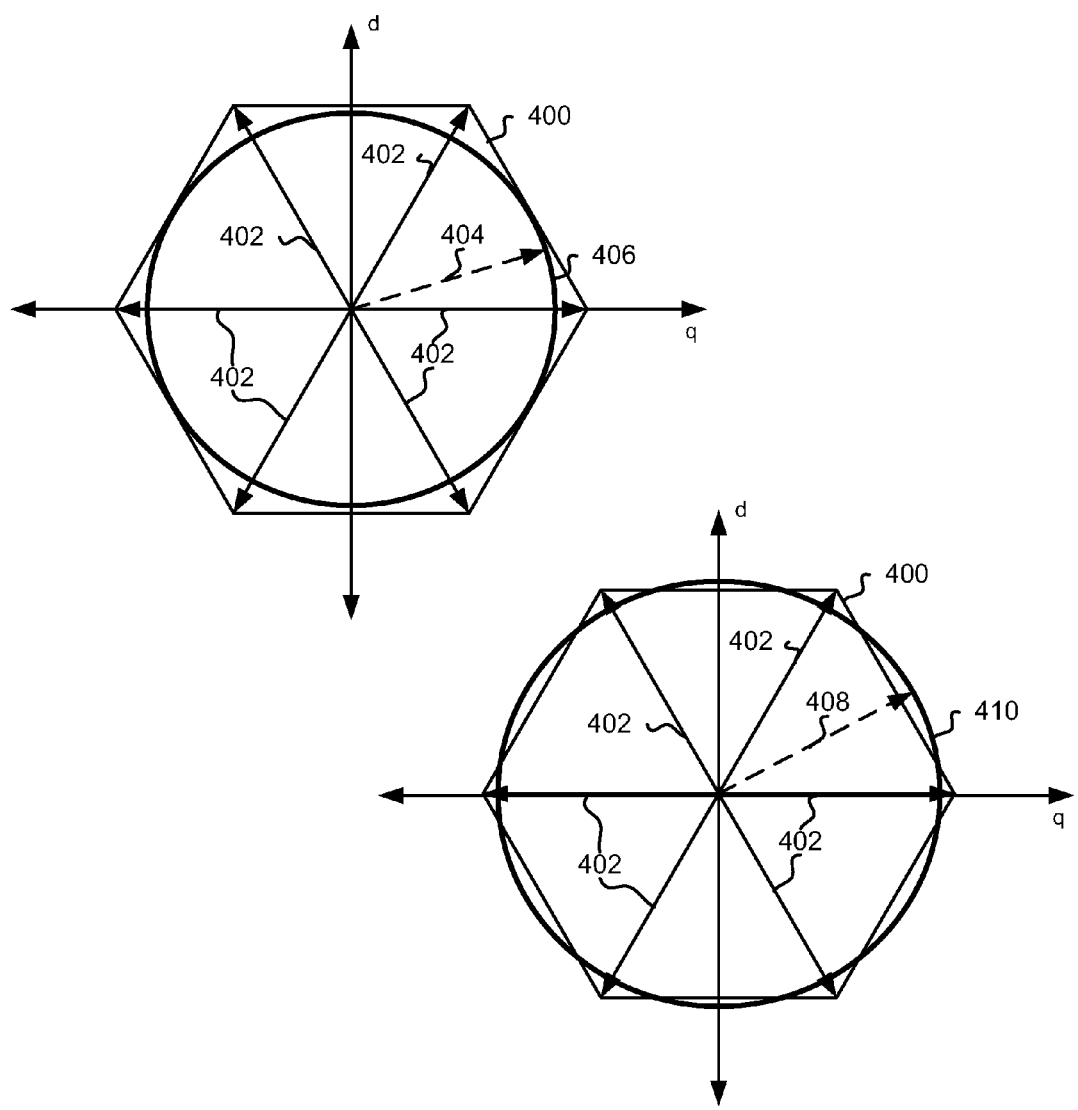
FIG. 4 is a graphical illustration of space vector modulation (SVM) and overmodulation techniques according to various embodiments.

At times, the voltage command will be high enough that resulting phase voltages would peak at or above the voltage on the battery bus ($V_{bus}$) provided by the battery 306. In some embodiments, this occurs when the voltage command represents a commanded line-to-line voltage which would result in a peak line-to-line voltage of the fundamental harmonic of the desired electrical frequency for the motor 310 above $V_{bus}$. In order to compensate, the modulation unit 304 may overmodulate the voltage command to produce a limited voltage represented by control signals da, db, and dc. Using SVM, according to some embodiments, overmodulation may allow additional bus utilization, although a non-sinusoidal phase winding operation may result. This overmodulation may allow for the production of additional torque above base speed. With reference to FIG. 4, SVM treats an inverter as a unit that can be driven into 8 states. These states may be represented as state voltage vectors 402 on a d-q coordinate axis system, with two null states not being illustrated (because they result in 0 voltage across motor phase windings). The state voltage vectors define the SVM hexagon 400 which represents peak voltages at or between inverter states. A reference voltage vector 404 may follow a circular trajectory 406 within the bounds for the SVM hexagon 400. This circular trajectory 406 represents maximum voltages without overmodulation. When the modulation unit 304 (FIG. 3) is in overmodulation, the voltage command may trace a voltage vector 408 that follows a commanded circular trajectory 410 with a larger diameter than the reference voltage vector trajectory 406. SVM overmodulation techniques limit portions of the commanded circular trajectory 410 to the boundaries of the SVM hexagon 400, essentially clipping and squaring off an otherwise sinusoidal waveform. Various amounts of overmodulation are possible, although the additional bus utilization at higher levels of overmodulation may come at a price of increased distortion and heat generation in the driven motor. Moderate amounts of overmodulation may be used to minimize adverse effects. According to various embodiments, modulating over the reference voltage vector 404 (and its circular trajectory 406) by 10%, or anywhere between 5% and 20% may provide useful results in terms of additional torque for a given bus voltage.

With reference again to FIG. 3, when a voltage command is overmodulated, the clipped output—the limited voltage control signals—may produce phase voltages which may not be known or measured. In order to determine phase voltages for flux estimation purposes, the voltage estimator 312 can make an estimate based on the limited voltage control signals. The voltage estimator 312 may calculate an estimate of the phase based on receiving the limited voltage control signals (duty cycles) converted into 2-phase, and also various voltage affecting characteristics of the system, 300 (e.g. dead-time, IR drop across phases). These estimated phase voltages may then be used to generate a flux estimate.

According to some embodiments, phase currents and resistance may be taken into consideration by the voltage estimator 312 or the flux estimator 314. After estimating a phase voltage to be applied to the motor 310, the voltage estimator 312 may use a phase current I measurement multiplied by a phase winding resistance R to determine a voltage drop IR in the phase winding. This voltage drop may be subtracted from the estimated phase voltage by the voltage estimator 312 before communicating with the flux estimator 314. According to other embodiments, the flux estimator 314 may receive a phase voltage estimate and may perform the IR phase winding voltage drop subtraction itself.

Figure 5:
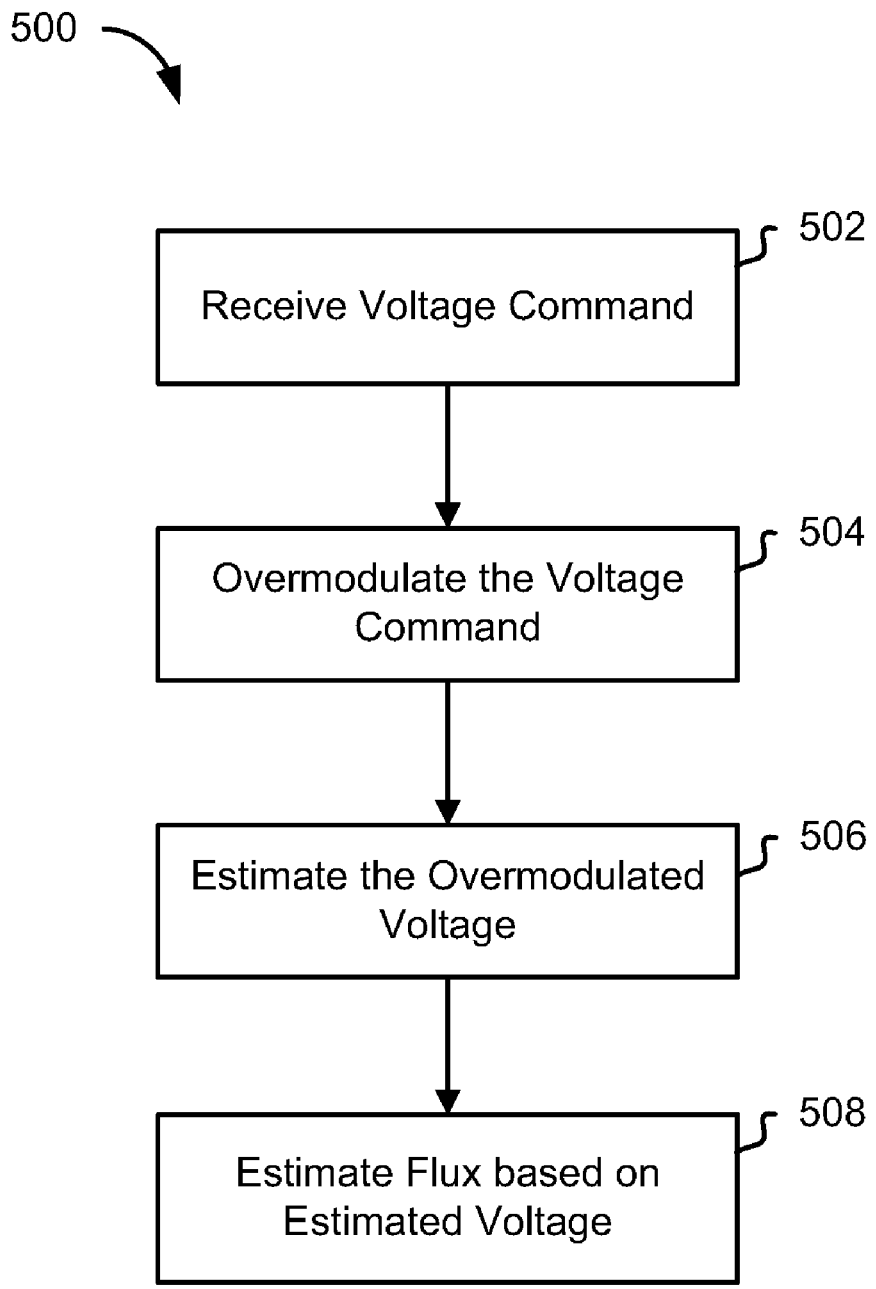
FIG. 5 is a flow diagram illustrating a method for estimating flux according to various embodiments.

FIG. 5 is a flow diagram illustrating a method 500 for estimating motor flux according various embodiments. The method 500 begins with receiving a voltage command (block 502). The voltage command may be received at one or more of a modulation unit, an inverter, or an estimation module, such as a voltage estimator. In order to use the voltage command to control a motor, the voltage command may be modulated to produce control signals to allow an inverter to generate phase voltages to apply to the motor. In some cases, depending on the magnitude of the voltage command, overmodulation may be employed to generate limited voltage control signals (block 504). A voltage estimator may subsequently or concurrently estimate the value of the phase voltages produced by the limited voltage control signals (block 506). The estimated phase voltages may then be directed to a flux estimator which can use the estimated phase voltages to determine a flux estimate (block 508). The flux estimate may be an estimate of one of the various flux linkages in a motor at a given time.

Figure 6:
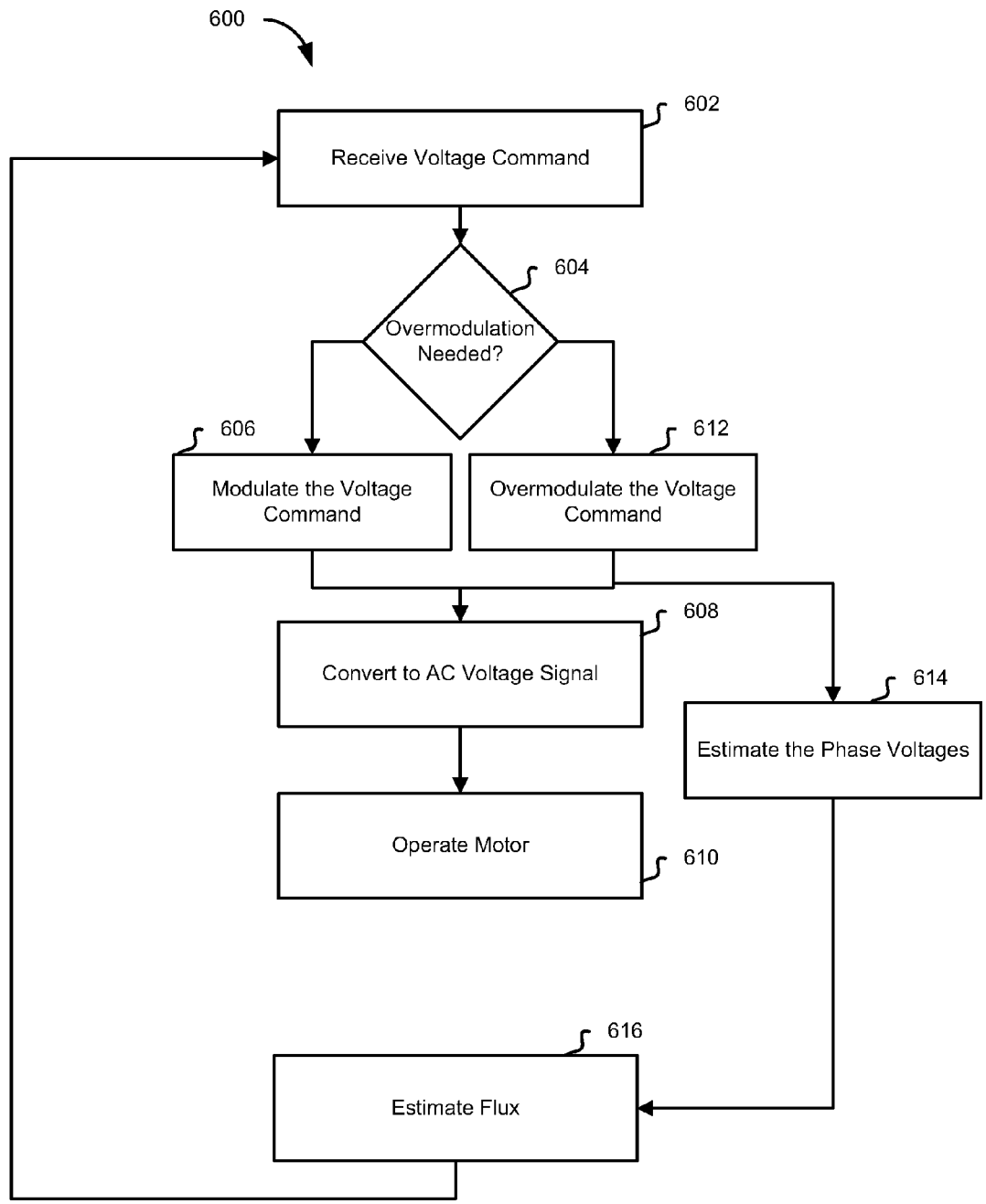
FIG. 6 is a more detailed flow diagram illustrating a method for providing motor control feedback according to various embodiments.

FIG. 6 is a more detailed flow diagram illustrating a method 600 for providing motor control feedback, according to various embodiments. The method 600 begins as described with reference to FIG. 5, by receiving a voltage command (block 602). By comparing the voltage command to a battery bus voltage, a determination may be made as to whether overmodulation is needed (block 604). If the voltage command is substantially close to or exceeding the battery bus voltage, overmodulation may be performed due to peak voltages above the battery bus voltage not being attainable. The voltage command may need to be overmodulated to produce phase voltages within the limits of available voltages through the battery bus (block 612). If the voltage command, however, is suitably below the battery bus voltage, modulation (without clipping) may be performed (block 606). Control signals may be generated and sent to an inverter which may convert DC voltages into AC voltage signals—phase voltages to be applied across the windings of a motor (block 608). The AC voltage signals may be then used to operate a motor (block 610). According to some embodiments, the AC voltage signals may be directed at the phase windings of a three phase AC induction motor. A torque output may be produced by the motor based on the characteristics of the AC voltage signals. The generated control signals may also be converted from 3-phase to 2-phase and sent to a voltage estimator to estimate the phase voltages (block 614). The estimated phase voltages may then be used to estimate flux through the motor (block 616).

There are a number of characteristics that may be useful in generating a new voltage command to control the operation of the motor. Characteristics such as the flux through the motor, the voltages applied to each phase, the current through the motor, motor speed, and others are used in various calculations that may determine voltage command values necessary to produce desired amounts of torque. Being able to obtain the above mentioned characteristic data may help assure accurate, predictable and stable operation of the motor. Once a voltage command is received, modulated, and converted to an AC signal, the final voltage applied to each phase of the motor may be useful in estimating the flux across the motor. The estimated flux value may be used in calculating a voltage command to correspond to a particular torque request or command.

In the case that overmodulation is performed on the voltage command (blocks 604 and 612), limited voltage control signals may be generated which represents a clipped version of the original voltage command. As with a non-clipped voltage command, the limited voltage control signals may be converted into AC voltage signals (block 608) and applied to the phases of the motor in order to operate the motor (block 610). Rather than attempting to measure the actual phase voltages of the motor to get a voltage value, the limited voltage control signals may be used to provide an estimate (block 614). The estimation may take into account various voltage drops across the control system and motor. The phase voltages may be estimated and used to estimate a flux value (block 616) without the need for actual measurement.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. A motor control system comprising:
   a control module configured to generate a voltage command in response to a torque request;
   a modulation module configured to receive the voltage command as an input and to generate control signals;
   an inverter coupled to a motor, said inverter configured to receive said control signals from said modulation module and to generate voltage signals to drive said motor;
   a feedback system for continuously modifying said voltage command generated by said control module, said feedback system comprising:
      a voltage estimator configured to receive the control signals from the modulation module and to generate estimated phase voltages of the motor based on the control signals; and
      a flux estimator configured to receive the estimated phase voltages from the voltage estimator and to generate an estimated flux value based on the estimated phase voltages, the flux estimator to provide the estimated flux value to the control module, wherein said control module generates said voltage command in response to said torque request and said estimated flux value.

2. The motor control system of claim 1, wherein the motor is an induction motor and the estimated flux value is the estimated flux within the induction motor.

3. The motor control system of claim 1, further comprising a battery bus having a battery bus voltage, said battery bus coupled to said inverter and said voltage estimator, wherein said inverter generates said voltage signals based on said control signals and said battery bus voltage, and wherein said voltage estimator generates said estimated phase voltages based on said control signals and said battery bus voltage.

4. The motor control system of claim 1, wherein the modulation module includes a pulse width modulation controller to apply pulse width modulation to the voltage command.

5. The motor control system of claim 1, wherein the modulation module overmodulates the voltage command, and wherein said control signals correspond to a limited voltage.

6. The motor control system of claim 1, wherein the modulation module overmodulates the voltage command to optimize torque output and motor efficiency.

7. The motor control system of claim 1, wherein the modulation module overmodulates the voltage command to optimize torque output and reduce motor heat generation.

8. The motor control system of claim 1, wherein the modulation module overmodulates the voltage command substantially between inverter switching states.

9. The motor control system method of claim 1, wherein the modulation module overmodulates the voltage command when the voltage command commands a voltage greater than or substantially equal to a DC bus voltage.

10. The motor control system of claim 1, wherein the voltage takes into account at least one of the following: dead-time correction, resistance voltage drop across phase windings of the motor, and p-n junction voltage drop.

* * * * *